United States Patent Office 2,850,397
Patented Sept. 2, 1958

2,850,397
SILICATE GLASS ADHESIVE COMPOSITION

John E. Dereich, Painesville, Ohio, assignor to Diamond Alkali Company, Cleveland, Ohio, a corporation of Delaware No Drawing. Application May 13, 1953
Serial No. 354,885

9 Claims. (Cl. 106—83)

This invention relates to compositions of matter comprising aqueous adhesive silicate glass, which compositions are characterized by high adhesiveness to cellulose-containing materials, such as paper surfaces employed in laminated paper articles, but which are also characterized by lack of adhesion to heated metal surfaces. The compositions of the invention are further characterized by a high degree of plasticity under conditions to which they are subjected in use.

One of the steps of a typical paper laminating operation involves the pressing of the composite sheet after the adhesive has been applied to the plies and such plies have been arranged in laminated relationship. Generally, in the manufacture of corrugated paperboard, this operation is conducted by passing an advancing web of paper over a series of heated platens and pressing the web against the heated platens by means of one or more rollers, whereby the silicate glass is dehydrated and the laminations are united, thus forming a bond between the laminates.

In the manufacture of corrugated paperboard and similar laminates, the silicate glass adhesive may, for example, be applied to the peaks of the corrugations on one side of a corrugated sheet, which sheet is then contacted with a plane-surface facing sheet, and the composite thus formed passed over heated platens, while being subjected to pressure insufficient to destroy the corrugations of the corrugated member but sufficient to effect the bonding of the paper sheets. Thereafter, in accordance with this exemplary method of forming 3-ply laminates, the laminated structure may be coated a second time with an adhesive silicate glass at the peaks of the exposed corrugated surface of the laminate, and the thus-coated structure then formed brought into contact with a second plane-surface and the whole laminate again passed in contact with heated platens, while being subjected to pressure insufficient to destroy the corrugations of the corrugated member but sufficient to effect bonding of the laminate.

Difficulties in the manufacture of such corrugated paperboard arise when aqueous adhesive silicate glass comes into contact with the corrugating and pressure rolls, and the platens of the hot plate driers, forming hard glass-like deposits thereon, thus fouling the rolls and necessitating interrupting production to remove said deposits. Further, as the laminated structure passes between the pressure rollers and the platens of the hot-plate driers, some of the adhesive silicate glass exudes from the portions of the laminate nearest the edges thereof and to be deposited upon the heated surface of the platens. After a relatively short period of time, these deposits of the exuded adhesive silicate material accumulate upon the surface of the platens and build up into ridges or mounds near the region of the edges of the moving laminated web and under the influence of the relatively intense heat of the platen surface are dehydrated to a hard, strongly adherent, solid silicate glass. These deposits are then in a position to effect the destruction of the edges of the moving laminated structure passing across the heated platen surface. Moreover, as the production of laminated webs of lesser and greater widths may be scheduled alternately during a given production period, the changeover from the lesser to the greater widths may leave deposits of the dehydrated silicate glass in a position to mar substantial areas longitudinally of the wider webs. When the accumulation of the deposits of dehydrated silicate glass are sufficient to cause the destruction of substantial areas of the wider laminated webs passing thereover, the whole operation must be interrupted and the heated platens cleaned before further production of such wider webs may be started. A major difficulty in the cleaning operation arises from the fact that the dehydrated silicate glass adheres quite strongly to the platens, requiring considerable time and hand labor to dislodge the deposit and refinish the surface.

The present invention is directed to a composition and method for decreasing the adhesion of an adhesive silicate glass composition to heated metal surfaces generally.

Another object of the invention is to provide a method and composition for decreasing the adhesion of aqueous adhesive silicate glasses commonly employed in the paper laminating industry to the heated metal surfaces of the platens used to form laminates.

In manufacturing laminated materials, for example, boxboard as heretofore described, periodically it is necessary to interrupt normal operation of the equipment for a roll change or a break in the paper being processed. At such times, the board is already on the drying platens is exposed to heat longer than usual and, consequently, the silicate bond is dehydrated to such an extent that the board is unusable and must be discarded, the adhesive becoming quite brittle. As this is a substantial quantity of board, its loss is significant and the industry welcomes a contribution to the art that permits avoiding the loss.

It is therefore a further object of this invention to provide a method and composition which in use does not involve a board loss due to adhesive dehydration under normal operating conditions.

These and other objects will occur to those skilled in the art from the description of the invention set forth below.

The present invention contemplates the combination of a major proportion of aqueous silicate solution with materials which, while they do not interfere with the ultimate adhesiveness of the dehydrated adhesive silicate glass, nevertheless provide properties of non-adhesiveness to the heated metallic surfaces which come in contact with the composition, especially parts of boxboard manufacturing equipment, and which avoids board loss due to over-dehydration.

Silicate adhesives are well known in the art. They are composed of a wide variety of materials which adapt them to numerous requirements. Basically, and usually in box-board manufacture where the product is cellulosic, silicate adhesives include sodium silicate as an aqueous adhesive silicate glass solution in which the solids content, i. e., sodium silicate constituent, may range from about 35–45% and in which, on the average, the ratio of $Na_2O$ to $SiO_2$ in parts by weight falls between about 1 to 2.5 to 4. To this basic adhesive, suitable modifiers, diluents and the like are commonly added to form the silicate adhesives in which the problems herein described are encountered. For example, it is quite usual to add in small quantity, e. g., up to approximately 15% the total weight of the composition, an extender such as a finely divided clay, suitably Barden clay or other similar clay of the order of an average particle size of a few microns diameter or a material functioning similarly such as soybean meal, woodflour, starch, etc.; a corrosion inhibitor may be present if necessary of which the alkali metal chromates are exemplary and more commonly, sodium bichromate, in quantity of about .1 to 1% by weight. Additionally, the compositions are oftentimes diluted with water to suit particular flow requirements.

The present invention for its purposes, includes the addition of a modifying agent to such well known and similar aqueous adhesive silicate glass compositions which effects new and novel results. It is to be understood, however, that essentially the invention includes the addition of the herein disclosed modifying agent to an aqueous adhesive silicate glass solution, it being contemplated that skilled formulators, having knowledge of the foregoing described variety of compositions which may suitably be prepared, can and will adapt the teaching herein to their own particular requirements. The new modifier is of the class of natural resins, and more particularly, pine resins now more fully to be described.

The resin used in accordance with the present invention may be defined as the substantially petroleum hydrocarbon-insoluble pine wood resin prepared, for example, in accordance with the processes of U. S. Patents to Hall, Nos. 2,193,026 and 2,221,540. This material which in the claims herein is characterized by the term "substantially petroleum hydrocarbon-insoluble pine wood resin" is the resinous material which may be prepared from pine wood, for example, deciduous pine wood, as follows: The pine wood, which may or may not have been steamed to remove volatile constituents such as turpentine and pine oil, may be extracted with a coal tar hydrocarbon such as benzol or toluol, and the extract then freed of volatile constituents, leaving a residue consisting of a mixture of wood rosin and the resin used in the present composition. Extraction of this mixture with a petroleum hydrocarbon such as, for example, gasoline dissolves and removes the rosin. After separation of the rosin, high in abietic acid, a resinous residue remains which is low in abietic acid. Alternatively, the material obtained on evaporation of the coal tar hydrocarbon extract may be dissolved in a mixture of furfural and a petroleum hydrocarbon such as gasoline, and the two layers which form separated, in which case the substantially petroleum hydrocarbon-insoluble resin is found dissolved in the furfural phase from which it may be obtained by evaporation of the furfural. Other methods of isolating the desired petroleum hydrocarbon-insoluble pine wood resin may be employed, if desired. This resin, used in accordance with the present invention, is characterized by a dark red brown color, cherry red in solution, and by substantial insolubility in petroleum hydrocarbons, but it will vary somewhat in its specific characteristics such as acid number, melting point, exact petroleum ether solubility, and content of naphtha and toluol-insoluble material, depending upon the details of the extraction processes utilized. This resin will meet or nearly meet the following specifications, namely, substantial insolubility in petroleum hydrocarbons and water, substantially complete solubility in alcohol, slight solubility in alkaline medium, a methoxy content from about 3% to about 7..5% (usually from about 4% to about 6%), an acid number in the range from about 90 to about 110, and a drop melting point in the range from about 95° C. to about 125° C. (203° F. to 257° F.). This resin is a solid material and comes into commerce in the pulverized or ground form. For convenience herein the resin as described above is referred to as "Vinsol."

This invention contemplates the addition of Vinsol to aqueous adhesive silicate glass solutions and compositions in quantities sufficient to decrease the adhesion of such solutions and compositions to heated metal surfaces generally, and especially heated metal surfaces of apparatus employed in effecting an adhesive bond between a plurality of cellulosic webs, the decrease in adhesion being to such extent that adhering bonding agent is easily removable by light mechanical action as applied, for example, by a hand or fixed scraper, or by the action of moving webs as they may come into contact with the adhering material in moving through the laminating apparatus. The invention contemplates also improvements in the method or process of laminating webs of cellulosic material wherein heat and pressure are applied to effect lamination and, in consequence thereof, adhesive material is expressed from between the materials undergoing lamination and is deposited upon the heated metal surfaces of the laminating apparatus, there to adhere and harden to a difficulty removable state, the improvements comprising employing Vinsol modified bonding agents or adhesives as described herein to bond the webs. Also, the invention contemplates that the specific lamination method herein described and other methods may employ the herein disclosed bonding agents whether or not they involve the serious problems caused by the adhesive to metal bond, it being considered that the bonding agents of the invention have improved plasticity which reduces board loss due to overheating. Thus, the invention contemplates application of the bonding agents to processes and methods in general where similar or analagous problems are encountered and which are obviated by the bonding agents and methods herein disclosed.

The invention comprises the addition of Vinsol to aqueous adhesive silicate glass solutions, and compositions including such solutions, in any quantity that accomplishes the purposes of the invention. The relative proportion of ingredients of the bonding agents of the invention is not highly critical. Indeed, the addition of Vinsol in quantity larger than actually necessary for the purposes of the invention does not produce an intolerable condition in use. Generally, however, the invention contemplates that Vinsol will be added to aqueous adhesive silicate glass solution, containing on the average 35 to 45% solids and averaging on the weight basis 1 part $Na_2O$ to between 2.5 and 4 parts $SiO_2$ and suitably within the range of $1Na_2O$ to $3-3.5SiO_2$, preferably about $1Na_2O$ to 3.3 parts $SiO_2$, and which solution may suitably contain a small amount, for example about 1%, of an anionic wetting agent, of which aromatic monosodium sulfonate derived from petroleum oil, alkyl aryl sulfonates, coconut oil sulfonates, and the like are examples, to the extent of about 0.1 to about 1% taken by weight of the aqueous silicate glass solution, preferably about 0.5 to about 0.75%. As indicated, previously, other materials may be added as desired for particular purposes.

It is found that Vinsol is soluble in aqueous adhesive silicate glass solutions to the extent of about 1% on simple admixture with setting. Solubilizing this quantity of Vinsol without some added effect requires about 24 hours. Thus, this method of compounding the bonding agents herein may be employed within the purview of the invention. However, it is found more expedient to dissolve the Vinsol in a solvent such as acetone, methyl ethyl ketone, Cellosolve which is a trade designation by Carbide and Carbon Chemicals Company for its ethers of ethylene glycol, the lower molecular weight members of the series being the methyl, ethyl, and butyl monoethers of ethylene glycol, and thereafter admix the solution with the silicate solution. Following this technique not only permits admixture quickly and with ease, but it is also found that the bonding agent so produced is of improved character when compared with a bonding agent prepared by simple admixture of the Vinsol with the silicate glass. The quantity of solvent in which Vinsol is contained is not found to be critical; thus, once the requisite quantity of Vinsol is decided upon, as little solvent as is needed to dissolve that quantity of Vinsol may suitably be employed, in which case the solution is saturated; moreover, the Vinsol solution may be quite dilute. As a general guide, the total quantity of solvent as such for the purposes of this invention may suitably be restricted to about 10% by weight of the silicate glass solution and preferably to about 5% and below.

The following are specific examples of the bonding agents and methods of this invention:

*Example I*

A solution of 1½ grams of Vinsol in 2 grams of methyl ethyl ketone is added with stirring to about 390 grams of aqueous silicate glass solution having a solids content of about 38.3% and averaging on the weight basis about 1 part $Na_2O$ to about 3.3 parts $SiO_2$. The bonding agent so prepared is employed as the adhesive in the typical boxboard laminating apparatus and process herein described with excellent results. It is found that, in contrast to unmodified silicate adhesives as described hereinbefore, this composition is easily released from the heated platens and, further, boxboard temporarily stranded in the heated equipment does not become brittle but remains tacky and plastic. Additionally the actual adhesive bond which holds the cellulosic webs is as good as that provided by the usual silicate adhesive.

*Example II*

A methyl ethyl ketone solution containing 5 ml. of solvent and about ¾ gram of Vinsol is stirred into 100 grams of aqueous adhesive glass solution (the silicate solution being the same as described in Example I). The composition so formed was employed as in Example I with similar excellent results.

*Example III*

About ¾ of a gram of Vinsol is directly admixed with 100 grams of aqueous adhesive silicate glass solution of the character described in Example I. The bonding agent so prepared is employed as in Example I. Improvements of the nature sought by the invention are realized over the usual unmodified silicate glass adhesives though the improvements are not as significant as in the case of Examples I or II. Therefore, those examples may be regarded as embodying the invention in its preferred form.

*Example IV*

A solution of 1½ grams of Vinsol in 3 grams of acetone is prepared and mixed with the aqueous silicate glass solution of Example I. The bonding agent so prepared is employed as the adhesive in the typical boxboard laminating apparatus and process herein described with success equal to that of Example I.

*Example V*

About ½ gram of Vinsol is dissolved in about 5 ml. of Cellosolve and then mixed with 100 grams of the silicate solution described in Example I. The bonding agent so prepared is found to give results equally satisfactory with that of Example I when similarly employed.

While there have been described various embodiments of the invention, the methods and products described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. An aqueous adhesive silicate glass composition characterized by high adhesiveness to cellulose-containing materials but nonadhesion to metal surfaces, said composition consisting essentially in major proportion of an aqueous adhesive silicate glass solution and about 0.1 to 1.0% by weight of said solution of a substantially petroleum hydrocarbon-insoluble pine wood resin sufficient to impart the desired nonadherence to metal surfaces, said resin incorporated dissolved in a water-soluble, oxygen-containing organic solvent.

2. A composition as in claim 1 wherein said solvent is selected from the group consisting of low molecular weight ketones and ethers.

3. A composition as in claim 1 wherein said silicate solution has an $Na_2O:SiO_2$ ratio of about 1:2.5 to 4.

4. A composition as in claim 3 wherein said solvent is selected from the group consisting of low molecular weight ketones and ethers.

5. An aqueous adhesive silicate glass composition characterized by high adhesiveness to cellulose-containing materials but nonadhesion to metal surfaces, said composition consisting essentially in major proportion of an aqueous adhesive sodium silicate glass solution having an $Na_2O:SiO_2$ ratio of about 1:3.3 and about 0.1 to 1.0% by weight of said solution of a substantially petroleum hydrocarbon-insoluble pine wood resin sufficient to impart the desired nonadherence to metal surfaces, said resin being characterized by substantially complete solubility in alcohol, slight solubility in alkaline media, a methoxy content from about 3% to about 7.5%, an acid number in the range from about 90 to about 110, and a drop melting point in the range from about 95° C. to 125° C.

6. A composition as in claim 5 wherein said resin is incorporated dissolved in a water soluble, oxygen-containing solvent.

7. A composition as in claim 6 wherein said solvent is methyl ethyl ketone.

8. A composition as in claim 6 wherein said solvent comprises between about 1 and about 5 percent by weight of said composition.

9. A composition as in claim 5 wherein the said silicate glass solution comprises between about 94 and 98.50 percent by weight of said composition.

References Cited in the file of this patent

UNITED STATES PATENTS

| | | |
|---|---|---|
| 1,423,985 | Barringer | July 25, 1922 |
| 2,100,408 | Platt | Nov. 30, 1937 |
| 2,322,667 | Seastone et al. | June 22, 1943 |
| 2,387,367 | Vana | Oct. 23, 1945 |
| 2,433,965 | Upson | Jan. 6, 1948 |
| 2,494,744 | Christian et al. | Jan. 17, 1950 |
| 2,503,407 | Perry | Apr. 11, 1950 |
| 2,671,747 | Lander | Mar. 9, 1954 |

OTHER REFERENCES

Pamphlet by the Hercules Powder Co. entitled "Vinsol." Received in Div. 56 of the Patent Office Jan. 25, 1952.